United States Patent [19]
Waters et al.

[11] Patent Number: 4,932,070

[45] Date of Patent: Jun. 5, 1990

[54] MECHANISM FOR DERIVING ACCURATE FREQUENCY REFERENCE FOR SATELLITE COMMUNICATIONS BURST DEMODULATOR

[75] Inventors: George W. Waters, Indialantic; Charles R. Burr, Palm Bay; Charles W. Richards, IV, Melbourne Beach, all of Fla.

[73] Assignee: Scientific Atlanta, Atlanta, Ga.

[21] Appl. No.: 234,937

[22] Filed: Aug. 22, 1988

[51] Int. Cl.$^5$ .......................... H04B 1/60; H04J 3/06
[52] U.S. Cl. ..................................... 455/10; 455/12; 455/52; 370/104.1
[58] Field of Search .................. 455/12, 69, 13, 9, 10, 455/17, 20, 21, 23, 51, 52, 53; 370/104, 108, 75; 340/825.14, 825.16; 375/111, 3, 110; 371/40, 42

[56] References Cited

U.S. PATENT DOCUMENTS

| | | | |
|---|---|---|---|
| 4,509,200 | 4/1985 | Luginbuhl et al. | 455/52 |
| 4,554,672 | 11/1985 | Masamura | 375/40 |
| 4,703,479 | 10/1987 | Ikeda | 375/40 |
| 4,748,622 | 5/1988 | Muratani et al. | 370/104 |

Primary Examiner—Reinhard J. Eisenzopf
Assistant Examiner—Curtis A. Kuntz
Attorney, Agent, or Firm—Antonelli, Terry & Wands

[57] ABSTRACT

Accurate tuning of a satellite system's burst demodulator to a signal which is subject to frequency offset in the course of its transmission over the satellite link is achieved without the use of high precision oscillators at remote sites, or the transmission of a dedicated pilot tone. Instead, a dedicated high precision clock is used for the purpose of establishing both the outlink carrier and the return channel carrier. The modulation of the data on the outlink carrier is also derived from the precision clock source. At each remote station, the outlink channel is monitored to recover the high precision clock. This recovered clock is then used as a reference for generating the return channel carrier. The burst demodulator equipment at the master station monitors both the outlink channel continuous carrier and burst mode transmissions from the remote stations. Each of the continuous and burst mode carriers, having been transmitted through the satellite, will undergo the same frequency offset or modification, so that the frequency difference between the outlink channel carrier and the return link channel carrier will always be constant. The outlink channel carrier, which is available on a continuous basis, is used to derive a local oscillator frequency reference for establishing the burst demodulator's local oscillator reference.

23 Claims, 3 Drawing Sheets

MECHANISM FOR DERIVING ACCURATE FREQUENCY REFERENCE FOR SATELLITE COMMUNICATIONS BURST DEMODULATOR

FIELD OF THE INVENTION

The present invention relates in general to satellite communication systems and is particularly directed to a mechanism for providing an accurate frequency reference for enabling a burst demodulator to recover information signals from a carrier that has been subjected to a frequency offset during its transmission over the satellite communication link.

BACKGROUND OF THE INVENTION

The successful operation of satellite communication networks, such as demand assignment (contention) systems, depends upon the ability of the receiver equipment at the respective stations of the network to be accurately tuned to the incoming signal from another site. In a demand assignment communications scheme, messages from respective contention participants of the network are transmitted in a burst format, in which a respective station's carrier is turned on for an abbreviated period, or time slot, during which a message (e.g. data packet) is transmitted and then turned off until that station has a new message to send.

Because of the intermittent nature of burst mode communications and carrier distortion introducing characteristics of the satellite channel, the ability to provide an accurate demodulation reference frequency for signal recovery becomes a significant problem. One way to solve the problem is to provide each station with a high precision oscillator which monitors an effectively perfectly stable pilot frequency, that has been transmitted from a master site, in order to determine frequency offset through the satellite link and to use this information to accurately control the characteristics of its burst carrier, so that the message, when received at the master site, will be effectively precorrected, permitting demodulation and data recovery. The problem with this approach is two-fold: on the one hand, the cost of the equipment at each burst-sourcing site is increased substantially by the provision of the high precision reference oscillator. In addition, because the network uses a pilot tone for the purpose of frequency correction, the capacity of the satellite link (an extremely precious resource) for data transmission is reduced.

One proposal to eliminate part of the problem, namely to reduce the expense of the equipment (high precision oscillator) at the burst-sourcing site is described in U.S. Pat. No. 4,509,200 to Luginbuhl et al, entitled "Satellite Telecommunications System". Pursuant to the patented scheme, a high precision pilot tone oscillator is installed at the master or central station, the only purpose of which is to measure frequency offset (drift) through the satellite. By monitoring the pilot tone over a loop back to itself, the master station is able to measure the offset through the satellite, which, as pointed out above, must be corrected. A signal representative of the value of this measured offset or error is then transmitted as an information signal for use at each remote site. The remote site, which does not have the benefit of the high precision oscillator, extracts the data to properly tune itself. This operation presupposes that the remote site is properly tuned to begin with, something that the coarse oscillator used at the remote site cannot guarantee. Consequently, the proposed procedure is questionable at best. Of course, due to the fact that the patented scheme dedicates part of the satellite link to the offset-controlling pilot tone, the resource occupancy problem still exists.

SUMMARY OF THE INVENTION

In accordance with the present invention, the ability to accurately tune a demodulator to an intermittently transmitted (burst) signal, which is subject to frequency offset in the course of its transmission over the satellite link, is achieved without either of the above-mentioned conventional artifices, including the installation of high precision oscillators at the remote sites, or the transmission of a separate, dedicated pilot tone for the purpose of correcting the problem of frequency offset through the satellite link.

Pursuant to the present invention, a single, dedicated high precision clock is used for the purpose of establishing both the outlink carrier from the master station to each of the remote stations and the return channel carrier through which each remote station transmits burst messages to the master site over the satellite link. In addition, the modulation of the data on the outlink carrier is derived from the same precision clock source. At each remote station, the outlink channel is monitored to recover the high precision clock. This recovered clock is then used as a reference for generating the return channel carrier.

Rather than attempt to correct or premodify either the outlink channel continuous carrier or the return link channel burst carrier, the system permits both channels to be subjected to the drift or offset through the satellite. The burst demodulator equipment at the master station monitors both the outlink channel continuous carrier (that has been transmitted through the satellite and has thereby been subjected to the satellite link offset) and the incoming burst mode transmissions from the remote stations. Each of the continuous and burst mode carriers, having been transmitted through the satellite, will undergo the same frequency offset or modification. Consequently, the frequency difference between the outlink channel carrier and the return link channel carrier will always be constant. The outlink channel carrier, which is available on a continuous basis, is used to derive a local oscillator frequency reference for establishing the burst demodulator's local oscillator reference. As a consequence, regardless of any drift through the satellite, the burst demodulator is always referenced to a local oscillator signal that tracks, precisely, any variation in the burst carrier.

Pursuant to a further feature of the present invention, advantage is taken of the fact that the outlink channel carrier is modulated with a timing signal that governs the occurrence of contention time slots that are used by the remote stations to send messages over the return link channel to the master station. The availability of this timing signal and the ability to adjust the operational frequency characteristics of the programmable frequency synthesizers for each of a continuous channel section (from which the 'continuous' local oscillator frequency reference is obtained) and a burst channel recovery section (from which the burst demodulator's reference is obtained) of the burst demodulator facilitates substitution of a redundant or backup unit in place of another unit.

DETAILED DESCRIPTION

Figure 1:
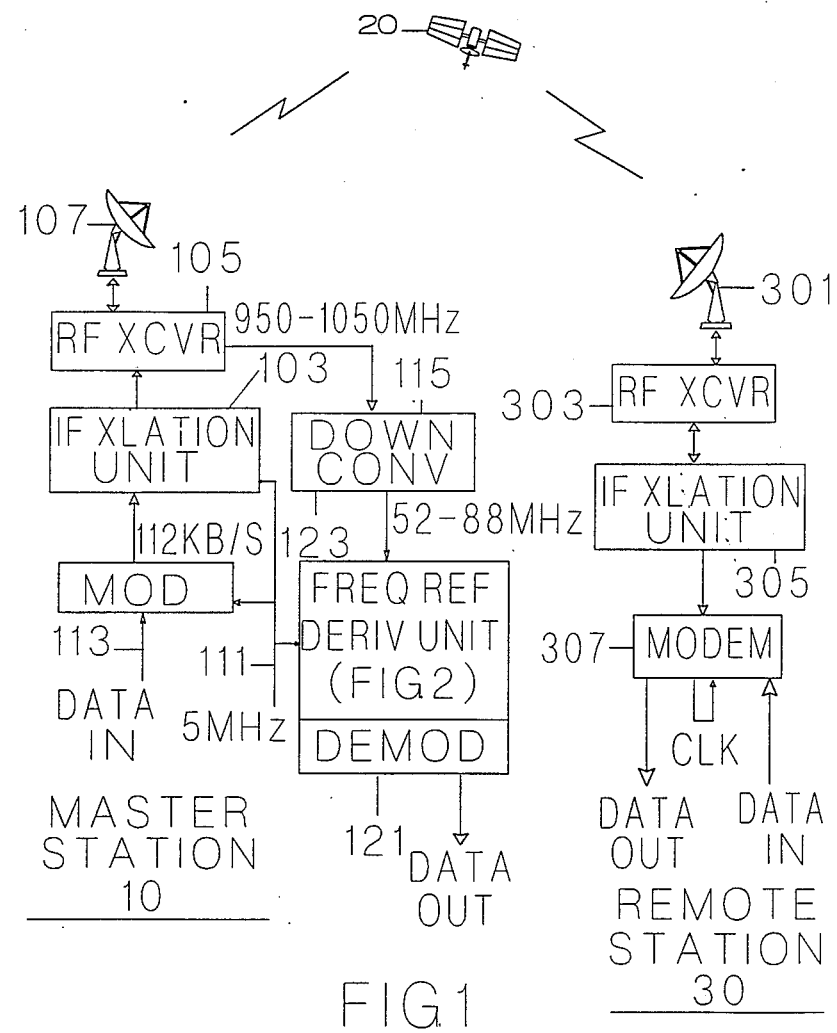
FIG. 1 is a diagrammatic illustration of a satellite communications network employing the burst demodulator frequency reference derivation mechanism in accordance with the present invention.

Before describing, in detail, the particular improved burst demodulator frequency reference derivation mechanism in accordance with the present invention, it should be observed that the invention resides primarily in a novel structural combination of conventional communication circuits and components and not in the particular detailed configurations thereof. Accordingly, the structure, control and arrangement of these conventional circuits and components have been illustrated in the drawings by readily understandable block diagrams which show only those specific details that are pertinent to the present invention, so as not to obscure the disclosure with structural details that will be readily apparent to those skilled in the art having the benefit of the description herein. Thus, the block diagram illustrations of the figures do not necessarily represent the mechanical structural arrangement of the exemplary system, but are primarily intended to illustrate the major structural components of the system in a convenient functional grouping, whereby the present invention may be more readily understood.

Referring now to FIG. 1, a diagrammatic illustration of a satellite communications network employing the burst demodulator frequency reference derivation mechanism in accordance with the present invention is illustrated as comprising a master or central station 10 which communicates by way of a satellite 20 with a plurality of remote stations, an individual one of which 30 is shown in the Figure. In effect, the network may be considered to be what is normally referred to as a star-configured satellite communications network, with the hub of the star corresponding to master station 10 and the points of the star corresponding to the locations of the remote stations 30. For purposes of providing an illustrative example, the network will be assumed to be a Ku band system, the outlink channel (master-to-remote) carrier and return link channel (remote-to-master) carrier frequencies of which are on the order of 14 GHz up to the satellite and 12 GHz down from the satellite. Preferably, the communications control mechanism is of the type described in copending U.S. patent application Ser. No. 236,756, filed Aug. 26, 1988, entitled "Link Utilization Control Mechanism for Demand Assignment Satellite Communications Network" by E. Gerhardt et al and assigned to the assignee of the present application, the disclosure of which is incorporated by reference herein. However, it should be observed that the present invention is not limited to use with this or any other particular type of system, but is applicable to any communication system employing burst communications that is subject to a frequency offset over the channel.

In the exemplary system, the outlink channel carrier, which is continuously transmitted from master station 10, is modulated with a network timing reference for establishing the occurrence of contention timeslots during which remote stations 30, each of which continuously monitors the outlink channel for messages directed to it from master station 10, transmit (burst) messages to the master station over the return link channel. Namely, each of remote stations 30 transmits messages to master station 10 in a demand assignment or contention burst-mode format through the satellite 20 by way of the dedicated remote-to-master return link.

As mentioned briefly above, a burst reference derivation equipment of the present invention obviates the need for installing a high precision oscillator at each of the remote sites and avoids the necessity of having to pre or post correct the frequency offset through the satellite 20. For this purpose, the network employs only a single precision reference oscillator, located at the master site, through which the outlink channel carrier and the return link channel carrier are generated.

More specifically, at the master station, a baseband clock signal (e.g. 5 MHz) from a precision source is applied over link 111 to the clock input of a (BPSK) digital data modulator 101 and to the reference input of an IF translation (up-converter) unit 103. Modulator 101 contains conventional frequency reference converter circuitry (frequency multiplier/phase locked loop components) for clocking input data on link 113 in accordance with a prescribed baud rate (e.g. 112 kb/s) for application to IF up-converter 103, which is also controlled by high precision 5 MHz clock from link 111. Up converter 103 is of conventional configuration, multiplying the high precision 5 MHz clock to convert the baseband signal (112 kb/s) to an intermediate frequency on the order of 140 MHz. This IF signal is then applied to RF transceiver unit 105 which translates the IF signal up to Ku band (14 GHz) for application to RF antenna 107 and transmission over the outlink channel through the satellite 20 to each of the remote sites 30.

Each remote site 30 includes an antenna dish 301 and associated RF transceiver unit 303 for receiving outlink channel messages and for transmitting return link burst messages. The receive output of RF transceiver unit 303 is coupled to RF-IF down-converter 305 which outputs an IF signal (e.g. at an IF frequency of 950-1450 MHz) to modem 307. Modem 307 includes a demodulator section which operates off a 50 MHz clock source (driving a phase lock loop) to generate a reference 112 KHz for recovering the incoming data stream. As mentioned previously, rather that employ an expensive precision oscillator to generate the modem reference, the remote site derives its reference from the highly accurate clock through which the data is modulated and through which the outlink IF frequency is produced.

For this purpose, modem 307 contains conventional a phase locked loop clock recovery circuit for recovering the 112 kHz clock contained within the incoming data stream. In addition to using the recovered clock for data demodulation, this same recovered precision clock is fed to the modulator section of modem 307, where it is used as a reference to a narrow bandwidth phase lock loop that is driven by an otherwise less precise local oscillator (e.g. 50 MHz). This local oscillator is used by the up-conversion section of IF translator unit 305 for providing a highly accurate local oscillator reference through which data modulation and frequency translation (from baseband to an IF frequency on the order of 950-1450 MHz) are carried out. Thus, because the modulation reference frequency is derived from a precision source (located at the master station), it is unnecessary to install a separate high precision reference frequency oscillator at each remote station. The up-converted signal is output from IF stage 305 to transceiver 303 for transmission on the return link channel (carrier frequency=14 GHz).

It should be noted that the frequency offset through the satellite is not a problem for data recovery at the remote stations since the outlink channel carrier frequency is continuously transmitted and the high precision reference (5 MHz) clock signal from which the carrier is derived is used for modulating the data, which is unaffected by the frequency offset through the satellite. The problem to which the present invention is directed, on the other hand, is the fact that messages from the remote stations to the master station are burst mode, rather than continuous mode transmissions, so that a data recovery reference frequency that may be used by the master station to demodulate received burst traffic is not continuously available from the remote stations.

In accordance with the present invention, however, advantage is taken of the fact that the outlink channel carrier is continuously available to the master station and undergoes the same offset through the satellite to which burst mode transmissions on the return link channel are subjected. Because burst mode transmissions on the return link channel and continuous mode transmissions on the outlink channel undergo the same offset through the satellite, regardless of the frequency differential between the outlink channel and the return link channel, the difference between the two is always constant, regardless of the magnitude of the offset through the satellite (which will vary with time). In accordance with the present invention, this constant differential characteristic is employed at the master site to derive a reference recovery frequency for a burst mode demodulator and thereby obviate the need for transmitting a separate pilot tone for correcting the offset through the satellite.

Figure 2:
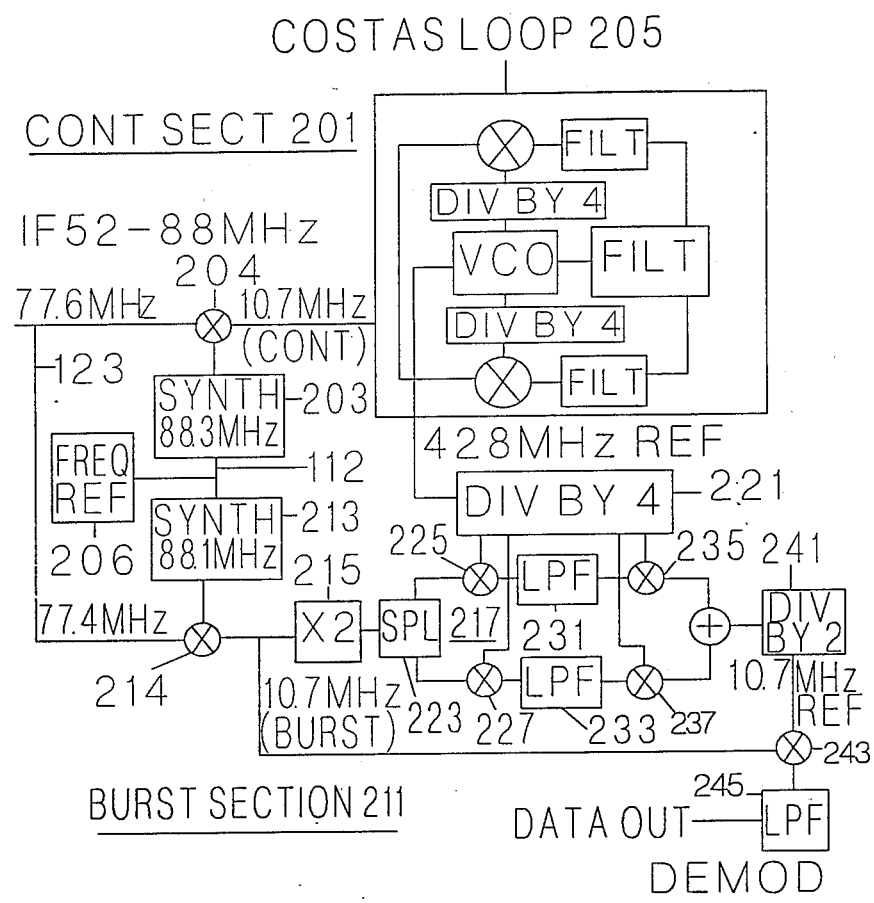
FIG. 2 is a diagrammatic illustration of the components of the burst frequency reference derivation unit employed in the system shown in FIG. 1.

More particularly, as shown generally in FIG. 1 and in detail in FIG. 2, the master station employs a burst mode demodulator 121, coupled to a dual RF-IF down-converter stage 115, which down-converts the outlink and return link channels from the 12 GHz band to the 950 to 1450 MHz band. The burst mode demodulator monitors the IF (950-1450 MHz) outputs (burst and continuous mode outputs) of transceiver 105 and provide a pair of further down-converted (e.g. 52-88 MHz) outputs on link 123. For purposes of an illustrative example, within the passband of interest as output, the continuous mode signal may have an IF frequency of a 77.6 MHz, while the burst mode signal may have an IF frequency of 77.4 MHz.

As shown in FIG. 2, demodulator 121 includes a continuous frequency reference recovery section 201 and a burst frequency reference recovery section 211. Both sections are coupled to link 123, so that each section receives the pair of IF frequencies (77.4 and 77.6 MHz) from IF down-converter 115. Link 123 is coupled to first inputs of mixers 204 and 214, second inputs of which are respectively coupled to the outputs of frequency synthesizers 203 and 213. Each of frequency synthesizers 203 and 213 is adjustable in 100 kHz steps over a 36 MHz bandwidth and is driven by a local clock reference supplied over link 112. Link 112 is coupled to a frequency reference 206 on the order of 12.8 MHz, in response to which synthesizer 203 produces a precision output of 88.3 MHz, and synthesizer 213 produces a precision output of 88.1 MHz.

For the above discussed outlink and return link channel separation of 200 KHz (77.6 MHz–77.4 MHz), each of mixers 204 and 214 will produce an output of 10.7 MHz in response to the 88.3 MHz and 88.1 MHz signals generated by synthesizers 203 and 213, respectively. The first, continuous reference frequency of 10.7 MHz produced at the output of mixer 204 is coupled through a Costas loop 205, which produces an output frequency on link 207 that effectively tracks frequency variations of the continuous outlink channel carrier. Costas loop 204 operates at a multiple of the 10.7 MHz produced by mixer 204 (e.g. four times the input 10.7 MHz rate at 42.8 MHz). Output link 207 is coupled to a divide-by-four divider 221 which controls the operation of a bandpass filter 217 within burst recovery section 211.

Within the burst recovery section 211, the output of mixer 214 is connected to a X2 multiplier 215. As in conventional modulator design, the output of the X2 multiplier is a signal at twice the IF frequency which is effectively stripped of the BPSK modulation on the IF signal. To be employed as a reference for the demodulator, it is necessary to bandpass filter this signal, and to then divide it by two, back to the 10.7 MHz frequency where it is available to provide a reference signal for demodulating the burst data signal. The output of X2 multiplier 215 is therefore coupled to the input of a tracking bandpass filter 217. Tracking bandpass filter 217 includes a splitter 223 to which respective in-phase (I) and quadrature (Q) channel filter sections are coupled. The in-phase filter section includes a mixer 225 to which the output of splitter 223 and the in-phase component of the 21.4 MHz output of divider 221 is coupled. The output of mixer 225 is coupled to a low pass filter 231, the output of which is coupled to a further mixer 235 which is driven by the 21.4 MHz output of divider 221. The quadrature channel includes a mixer 227, which is coupled to the quadrature output of 223 and is driven by the quadrature component of the 21.4 MHz output of divider 221. The output of mixer 227 is coupled through a lowpass filter 223 to a further quadrature mixer 237, which receives the 21.4 MHz output of divider 221. The outputs of mixers 235 and 237 are summed and then coupled to a divide-by-two divider 241, the output of which is the actual 21.4 MHz reference to be used for recovery of burst channel data. Each of low pass filters 231 and 233 has a bandwidth that is as narrow as possible, so as to recover the 10.7 MHz reference for demodulating the burst signal with as high a signal to noise ratio as possible. If fixed low pass filters were to be used for elements 231 and 233, their bandwidth would have to be at least twice the total frequency offset or drift through the satellite and down converter. By using tracking filters for elements 231 and 233, the possibility exists of using a narrower filter bandwidth, provided that the tracking filter has a control mechanism to allow it to properly track the incoming burst signal. It is for this reason that the reference signal from the outlink demodulator is generated (at 21.4 MHz). This reference signal exactly tracks any variation of the frequency of the burst signal. The bandwidth of the tracking filter can therefore be made much narrower than the frequency offset or drift through the satellite and downconverter. Its bandwidth can then be freely chosen to optimize the data recovery mechanism of the burst demodulator, (i.e. the bandwidth of the filter may be made just wide enough so that filter transients settle out during the burst preamble time.) The 21.4 MHz output of tracking filter 217 is divided by two, so that it may be used in the data recovery process.

Demodulation of the data is effected by coupling the 10.7 MHz reference output of divider 241 to one input of a mixer 243 the second input of which is coupled to receive the burst modulation signal produced at the output of mixer 214. The output of mixer 243 is coupled to a lowpass filter 245 from which the burst data is recovered.

In operation, each return link channel burst transmission from a remote station that passes through the satellite and is thereby subjected to its associated frequency offset or drift is accompanied by an outlink channel frequency that is being continuously transmitted and monitored by the master station's receiver equipment. Specifically, continuous frequency reference recovery section 201 produces an output frequency at twice the 10.7 MHz reference frequency, variations in which (as a result of the frequency offset through the satellite repeater) are the same as those of a burst mode signal on the return link channel whose IF signals are coupled to burst frequency reference recovery section 211. The center frequency of bandpass filter 217 of burst section is thereby controlled by a 10.7 MHz reference that tracks the 10.7 MHz component of the burst signal, so that an accurate reference for recovering the data from the incoming burst IF signal may be obtained.

As pointed out above, with the satellite communications network typically servicing a multiplicity of users, the master station will normally contain a plurality of transceiver equipments (of the type diagrammatically shown in FIGS. 1 and 2), and, in addition, contain one or more back-up or redundant units to be substituted or switched over in place of a previously on-line unit in the event of a malfunction or failure. Conventionally, substitution of redundant units has been accomplished by a (hardware intensive) controlled interconnect arrangement containing auxiliary switching components and transmission lines between dedicated redundant unit(s) and each on-line equipment. However, pursuant to a further feature of the present invention, by virtue of the availability of a system timing signal on the outlink channel carrier and the adjustability or programmability of frequency characteristics of the burst demodulator, substitution of a new unit simply requires an appropriate adjustment of the settings of the frequency synthesizers 203/213 (and a synthesizer for IF translator 305 which may be physically installed within the modem) in the redundant demodulator unit (configured in the manner shown in FIG. 2) and then placing that unit on line, while disabling the unit to be taken out of service, in accordance with the system timing signal that is modulated onto the outlink channel carrier.

Figure 3:
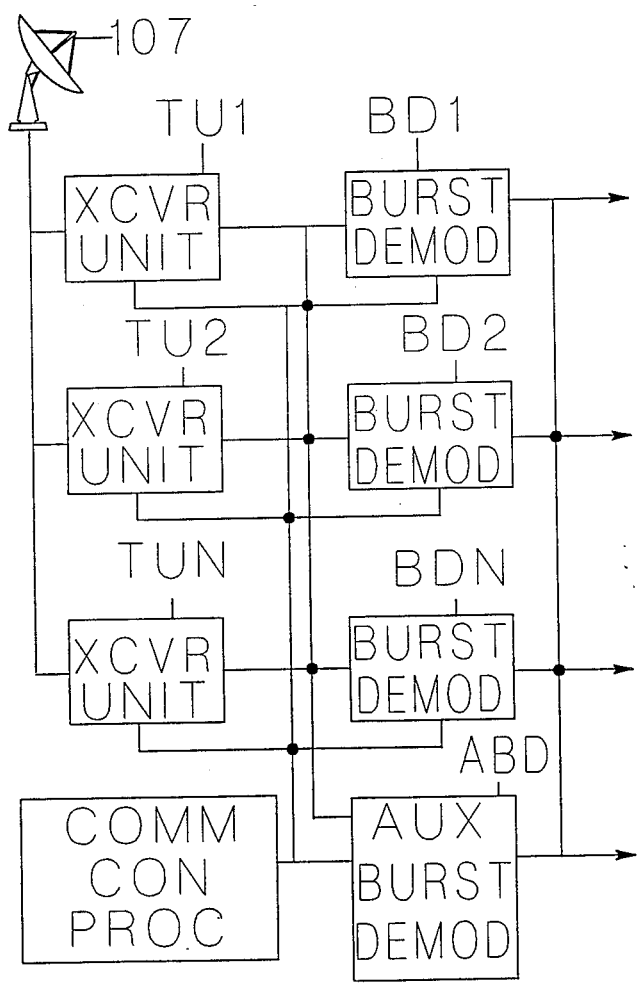
FIG. 3 diagrammatically shows a master station having a plurality of transceiver units and a redundant burst demodulator section shown in FIG. 2.

More particularly, as diagrammatically shown in FIG. 3, master station 10 may contain a plurality of transceiver units TU1, TU2, . . . , TUn, each of which comprises the continuous demodulator and burst demodulator sections described above with reference to FIGS. 1 and 2. In addition, as redundant equipment, the master station includes one or more auxiliary burst demodulators ABD of the type shown in FIG. 2, coupled in tandem with the burst demodulator in each of the transceiver units TU. Normally, the auxiliary burst demodulator ABD unit is off-line or in a quiescent state. However, in the event of the need to make an equipment substitution for an on-line demodulator, the master station communications control processor, through which the operation of the master station's communication equipment is controlled (as described in the above-referenced copending application), adjusts the frequency parameters of synthesizers 210 and 213 and then places the redundant demodulator unit on-line in synchronism with the system timing signal. At the same time it disables the unit to be removed from service. In other words, because of the availability of a network time slot-defining timing signal and the ability to adjust the frequency control parameters of the frequency synthesizer of each burst demodulator at the master station, the need for complex interface transmission lines and switching circuitry for effecting a backup replacement of the demodulator is avoided.

As will be appreciated from the foregoing description, the ability to accurately tune a burst demodulator to an intermittently transmitted (burst) signal, which is subject to frequency offset in the course of its transmission over a satellite link, is achieved in accordance with the present invention without the use of conventional mechanism, such as the installation of high precision oscillators at the remote sites, or the transmission of a separate, dedicated pilot tone for the purpose of correcting the problem of frequency offset through the satellite link. Pursuant to the invention, through the use of a single, dedicated high precision clock for establishing both the outlink channel carrier and the return channel carrier and a novel dual continuous mode/burst mode demodulator configuration, it is possible to provide a burst recovery reference signal that is optimally filtered independent of frequency offset through the satellite.

In addition, the availability, at the master station, of a system timing signal and the ability to adjust the operational frequency characteristics of the burst demodulator's frequency synthesizers for each of a continuous channel section, from which the 'continuous' local oscillator frequency reference is obtained, and a burst channel recovery section, from which the burst demodulator's reference is obtained, facilitates substitution of a redundant or backup unit in place of another unit.

While we have shown and described an embodiment in accordance with the present invention, it is to be understood that the same is not limited thereto but is susceptible to numerous changes and modifications as known to a person skilled in the art, and we therefore do not wish to be limited to the details shown and described herein but intend to cover all such changes and modifications as are obvious to one of ordinary skill in the art.

What is claimed is:

1. For use with a communication system having a first station and a second station remote with respect to said first station, said first and second stations communicating with one another over a communication link that subjects the carrier frequencies of signals transmitted thereover to an offset of their respective frequencies, said first station modulating information signals for delivery to said second station onto a first carrier frequency that is transmitted by said first station over said link on a continuous basis, said second station modulating information signals for delivery to said first station onto a second carrier frequency that is transmitted over said link on a burst mode basis, a method of enabling information signals, modulated onto said second carrier frequency which is transmitted on a burst mode basis from said second station over said link to said first station and thereby subjected to said frequency offset, to be recovered at said first station comprising the steps of:

at said second station,
(a) generating said second carrier frequency in accordance with a reference signal derivable from said first carrier frequency received thereby; and at said first station,
(b) receiving each of said first and second carrier frequencies that have been transmitted over said communication link; and
(c) deriving, from said first and second carrier frequencies, a filtered burst demodulation reference frequency for demodulating information signals that have been modulated onto said second, burst mode carrier frequency by said second station.

2. A method according to claim 1, wherein step (a) comprises the steps of
(a1) generating said first carrier frequency at said first station by means of an effectively precise oscillator signal, and
(a2) generating said burst mode second carrier frequency at said second station in dependence upon the effectively precise oscillator signal through which said first carrier frequency received thereby has been generated at said first station.

3. A method according to claim 2, wherein said communication system comprises a satellite communication system and said communication link comprises a signal transmission path through said satellite.

4. A method according to claim 2, wherein step (c) comprises the steps of
(c1) down-converting respective continuous mode and burst mode signals transmitted on said first and second carrier frequencies through said satellite link and received by said first station to a first, lower frequency continuous mode signals and a second, lower frequency burst mode signal,
(c2) deriving, from said first, lower frequency continuous mode signal, a continuous reference frequency, and
(c3) combining said continuous reference frequency with said second, lower frequency burst signal to produce said burst demodulation reference frequency.

5. A method according to claim 4, wherein step (c3) comprises the step of employing said continuous frequency reference signal to define the center frequency of a tracking filter which is used to narrowly bandpass filter the burst frequency reference signal and thereby allowing the bandwidth of the tracking filter to be much less than the bandwidth of the frequency uncertainty of both signals, while allowing the burst frequency reference signal to remain at or near the center frequency of the bandpass filter.

6. A method according to claim 1, further including the step of:
at said first station,
(d) demodulating information signals that have been modulated onto said second carrier received thereby in accordance with said derived demodulation reference frequency.

7. A method according to claim 1, wherein step (c) comprises the steps of
(c1) down-converting respective continuous mode and burst mode signals transmitted on said first and second carrier frequencies through said communication link and received by said first station to a first, lower frequency continuous mode signals and a second, lower frequency burst mode signal,
(c2) deriving, from said first, lower frequency continuous mode signal, a continuous reference frequency, and
(c3) combining said continuous reference frequency with said second, lower frequency burst signal to produce said burst demodulation reference frequency.

8. A method according to claim 7, wherein step (c3) comprises the step of employing said continuous frequency reference signal to define the center frequency of a tracking filter which is used to narrowly bandpass filter the burst frequency reference signal and thereby allowing the bandwidth of the tracking filter to be much less than the bandwidth of the frequency uncertainty of both signals, while allowing the burst frequency reference signal to remain at or near the center frequency of the bandpass filter.

9. An apparatus for generating a burst demodulation reference frequency, for enabling a first station, within a communication system having first and second stations geographically separated from one another and communicating over a communication link that subjects the carrier frequencies of signals transmitted thereover to an offset of their respective frequencies, said first station modulating information signals for delivery to said second station onto a first carrier frequency that is transmitted by said first station over said link on a continuous basis, said second station modulating information signals for delivery to said first station onto a second carrier frequency that is transmitted over said link on a burst mode basis, to recover information signals that have modulated onto said second burst mode carrier frequency and transmitted from said second station over said link to said first station and thereby subjected to said frequency offset, comprising:

at said second station,
first means for generating said second carrier frequency in accordance with a reference signal derivable from said first carrier frequency received thereby; and at said first station,
second means for receiving each of said first and second carrier frequencies that have been transmitted over said communication link; and
third means, coupled to said second means, for deriving, from said first and second carrier frequencies received thereby, a burst demodulation reference frequency for demodulating information signals that have been modulated onto said second, burst mode carrier frequency by said second station. said second, burst mode carrier frequency by said second station.

10. An apparatus according to claim 9, wherein said first station includes means for generating said first carrier frequency in accordance with an effectively precise oscillator signal, and wherein said first means includes means for generating said burst mode second carrier frequency at said second station in dependence upon the effectively precise oscillator signal through which said first carrier frequency received thereby has been generated at said first station.

11. An apparatus according to claim 10, wherein said communication system comprises a satellite communication system and said communication link comprises a signal transmission path through said satellite.

12. An apparatus according to claim 9, wherein said third means includes down-conversion means for down-converting respective continuous mode and burst mode signals transmitted on said first and second carrier frequencies through said communication link and received by said first station to a first, lower frequency continuous mode signals and a second, lower frequency burst mode signal, means for deriving, from said first, lower frequency continuous mode signal, a continuous reference frequency, and means for combining said continuous reference frequency with said second, lower frequency burst signal to produce said burst demodulation reference frequency.

13. An apparatus according to claim 12, wherein said combining means comprises a tracking filter coupled to receive said continuous frequency reference signal to define its center frequency, said tracking filter being coupled to narrowly bandpass filter the burst frequency reference signal and thereby allowing the bandwidth of the tracking filter to be much less than the bandwidth of the frequency uncertainty of both signals, while allowing the burst frequency reference signal to remain at or near the center frequency of the bandpass filter.

14. An apparatus according to claim 10, wherein said first station further includes means for demodulating information signals that have been modulated onto said second carrier in accordance with said derived demodulation reference frequency.

15. An apparatus according to claim 11, wherein said third means includes down-conversion means for down-converting respective continuous mode and burst mode signals transmitted on said first and second carrier frequencies through said satellite transmission path and received by said first station to a first, lower frequency continuous mode signals and a second, lower frequency burst mode signal, means for deriving, from said first, lower frequency continuous mode signal, a continuous reference frequency, and means for combining said continuous reference frequency with said second, lower frequency burst signal to produce said burst demodulation reference frequency.

16. An apparatus according to claim 15, wherein said combining means comprises a tracking filter coupled to receive said continuous frequency reference signal to define its center frequency, said tracking filter being coupled to narrowly bandpass filter the burst frequency reference signal and thereby allowing the bandwidth of the tracking filter to be much less than the bandwidth of the frequency uncertainty of both signals, while allowing the burst frequency reference signal to remain at or near the center frequency of the bandpass filter.

17. An apparatus for generating a burst demodulation reference frequency, for enabling a first station, within a communication system having first and second stations geographically separated from one another and communicating over a communication link that subjects the carrier frequencies of signals transmitted thereover to an offset of their respective frequencies, said first station modulating information signals for delivery to said second station onto a first carrier frequency that is transmitted by said first station over said link on a continuous basis, said second station modulating information signals for delivery to said first station onto a second carrier frequency that is transmitted over said link on a burst mode basis, to recover information signals that have modulated onto said second burst mode carrier frequency and transmitted from said second station over said link to said first station and thereby subjected to said characteristic modification, comprising:
at said second station,
first means for generating said second carrier frequency in accordance with a reference signal derivable from said first carrier frequency received thereby and,
at said first station,
second means for receiving each of said first and second carrier frequencies that have been transmitted over said communication link,
a plurality of third means, each of which is coupled to said second means, for selectively deriving, from said first and second carrier frequencies received thereby, a burst demodulation reference frequency for demodulating information signals that have been modulated onto said second, burst mode carrier frequency by said second station, and
fourth means, coupled to each of said third means, for selectively defining frequency control characteristics of each of said third means with respect to first and second carrier frequencies and enabling a selected third means to derive said burst demodulation reference frequency in accordance with said selectively defined frequency control characteristics.

18. An apparatus according to claim 17, wherein said first station includes means for generating a network timing signal that is modulated onto said first carrier frequency so as to define the times of occurrence of message transmission intervals for the transmission of messages from said second station to said first station and wherein said fourth means controllably enables said third means in accordance with said network timing signal.

19. An apparatus according to claim 18, wherein said first station further includes means for generating said first carrier in accordance with an effectively precise oscillator signal, and wherein said first means includes means for generating said burst mode second carrier frequency at said second station in dependence upon the effectively precise oscillator signal through which said first carrier frequency received thereby has been generated at said first station.

20. An apparatus according to claim 19, wherein said communication system comprises a satellite communication system and said communication link comprises a signal transmission path through said satellite.

21. An apparatus according to claim 21, wherein said third means includes down-conversion means for down-converting respective continuous mode and burst mode signals transmitted on said first and second carrier frequencies through said satellite link and received by said first station to a first, lower frequency continuous mode signals and a second, lower frequency burst mode signal, means for deriving, from said first, lower frequency continuous mode signal, a continuous reference frequency, and means for combining said continuous reference frequency with said second, lower frequency burst signal to produce said burst demodulation reference frequency.

22. An apparatus according to claim 21, wherein said combining means comprises a tracking filter coupled to receive said continuous frequency reference signal to define its center frequency, said tracking filter being coupled to narrowly bandpass filter the burst frequency reference signal and thereby allowing the bandwidth of the tracking filter to be much less than the bandwidth of the frequency uncertainty of both signals, while allowing the burst frequency reference signal to remain at or near the center frequency of the bandpass filter.

23. An apparatus according to claim 22, wherein said first station further includes means for demodulating information signals that have been modulated onto said second carrier in accordance with said derived demodulation reference frequency respective continuous mode and burst mode signals transmitted on said first and second carrier frequencies through said satellite link and received by said first station to a first, lower frequency continuous mode signals and a second, lower frequency burst mode signal, means for deriving, from said first, lower frequency continuous mode signal, a continuous reference frequency, and means for combining said continuous reference frequency with said second, lower frequency burst signal to produce said burst demodulation reference frequency.

* * * * *